United States Patent
Abe

(10) Patent No.: US 9,728,214 B2
(45) Date of Patent: Aug. 8, 2017

(54) DISK DRIVE AND POSITION CORRECTION METHOD

(71) Applicant: Kabushiki Kaisha Toshiba, Minato-Ku, Tokyo (JP)

(72) Inventor: Masakazu Abe, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/059,800

(22) Filed: Mar. 3, 2016

(65) Prior Publication Data

US 2017/0169846 A1    Jun. 15, 2017

Related U.S. Application Data

(60) Provisional application No. 62/267,516, filed on Dec. 15, 2015.

(51) Int. Cl.
  *G11B 21/02* (2006.01)
  *G11B 5/596* (2006.01)

(52) U.S. Cl.
  CPC .............................. *G11B 5/59627* (2013.01)

(58) Field of Classification Search
  None
  See application file for complete search history.

(56) References Cited

U.S. PATENT DOCUMENTS

| 6,292,320 | B1* | 9/2001 | Mason | G11B 5/5552 360/63 |
| 7,019,938 | B2* | 3/2006 | Miyata | G11B 21/083 360/77.04 |
| 7,298,573 | B2 | 11/2007 | Kitamura et al. | |
| 8,159,774 | B2 | 4/2012 | Ohtsubo et al. | |
| 9,019,650 | B1* | 4/2015 | Shan | G11B 5/48 360/75 |

FOREIGN PATENT DOCUMENTS

| JP | 2000322848 A | 11/2000 |
| JP | 2002157850 A | 5/2002 |
| JP | 2005141874 A | 6/2005 |
| JP | 4810603 B2 | 8/2011 |

* cited by examiner

*Primary Examiner* — K. Wong
(74) *Attorney, Agent, or Firm* — White & Case LLP

(57) ABSTRACT

A disk drive according to an embodiment includes a disk, a first actuator having a first arm, a second actuator having a second arm, and a head. The head includes a write head and a read head. In addition, the disk drive includes a control unit calculating an amount of shift from an initial value of offset in a radial direction of the disk between the read head and the write head. The control unit controls the second actuator and corrects a position of the head to a position where the shift amount is reduced.

20 Claims, 6 Drawing Sheets

DISK DRIVE AND POSITION CORRECTION METHOD

CROSS-REFERENCE TO RELATED APPLICATIONS

This application is based upon and claims the benefit of priority from U.S. Provisional Application No. 62/267,516, filed on Dec. 15, 2015; the entire contents of which are incorporated herein by reference.

FIELD

Embodiments described herein relate generally to a disk drive and a position correction method.

BACKGROUND

In a disk drive, read offset correction or the like has been performed based on a situation of surrounding environment or a disk eccentricity amount. In the read offset correction, offset (read offset) at the time of reading data written on the disk is corrected.

However, although it is presumed for the read offset correction that write data are recorded correctly at a desired position, this is not guaranteed. For this reason, in a case where mechanical displacement occurs in the disk drive after shipment at a factory, there is a possibility that the data recorded after the occurrence of the mechanical displacement are recorded at a position different from a desired position. As a result, in the disk drive, it may occur that the data written on the disk are not correctly read.

DETAILED DESCRIPTION

According to an embodiment, a disk drive is provided. The disk drive includes a disk, a first actuator having a first arm, and a second actuator having a second arm. The second actuator is moved by the first actuator. In addition, the disk drive includes a head which is moved by the second actuator. The head includes a write head which writes data in the disk and a read head which reads data from the disk. In addition, the disk drive includes a control unit which calculates an amount of shift from an initial value of offset in a radial direction of the disk between the read head and the write head as an offset shift amount. In addition, the control unit controls the second actuator and corrects a position of the head to a position where the offset shift amount is reduced.

Hereinafter, a disk drive and a position correction method according to an embodiment will be described in detail with reference to the accompanying drawings. The present invention is not limited to the embodiment.

Embodiment

Figure 1:
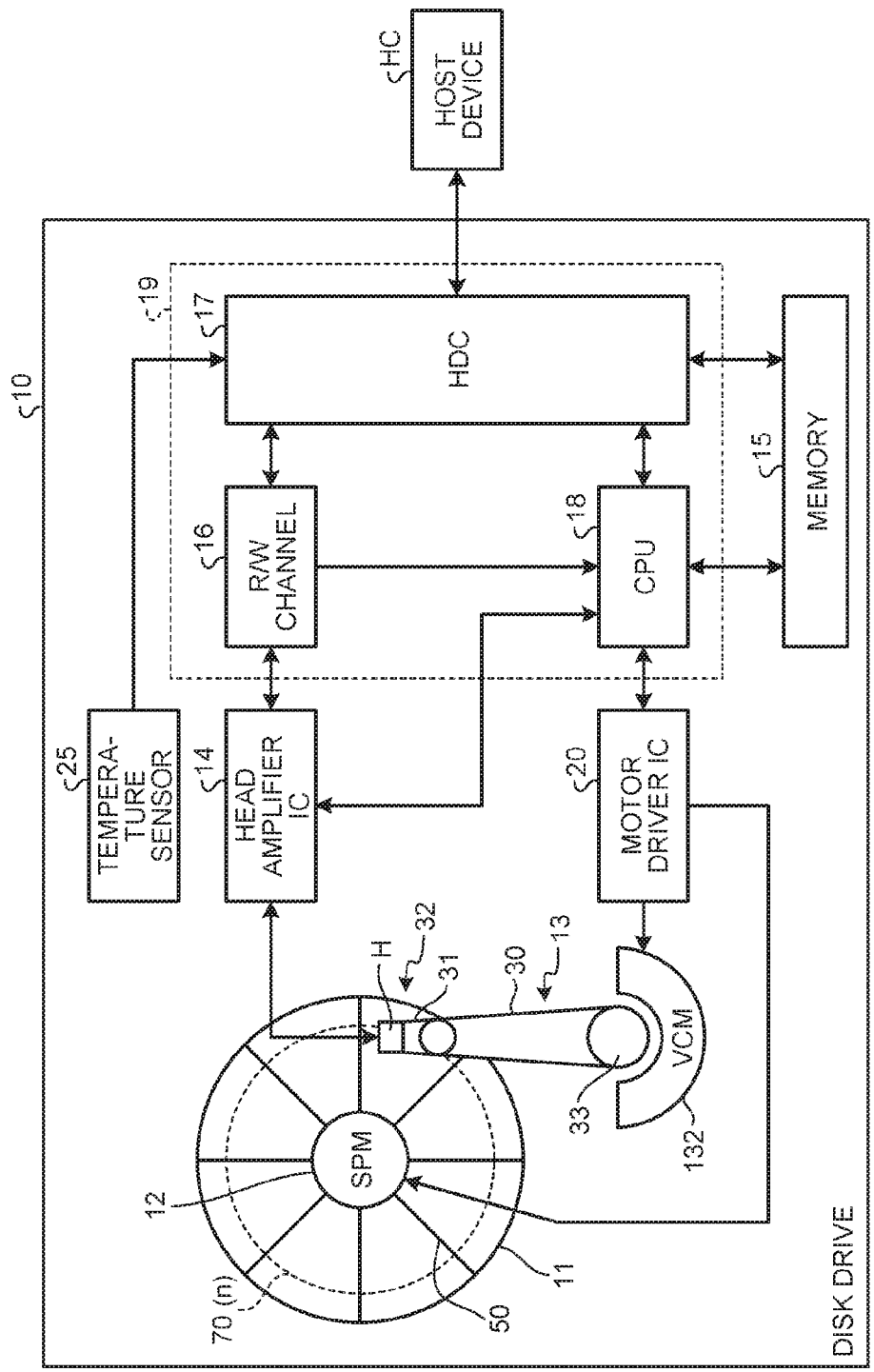
FIG. 1 is a diagram illustrating an example of a schematic configuration of a disk drive according to an embodiment.

FIG. 1 is a schematic diagram illustrating an example of a schematic configuration of a disk drive according to an embodiment. The disk drive 10 is a magnetic recording device such as a hard disk drive (HDD) and is used as an external storage device of a host device HC. The disk drive 10 is configured so as to be connectable to the host device HC. The disk drive 10 has a function of correcting a read/write offset (gap distance) which is a physical distance in a cross track direction between a read head 41 and a write head 42 included in a head H described later at a certain timing.

In the disk drive 10, in a case where mechanical displacement occurs, although the read head 41 performing position-alignment during a write period is located at a correct position-alignment target position (target position in a radial direction of the disk 11), there is a case where write data are recorded at a position other than an expected position.

The disk drive 10 according to the embodiment corrects a shift of read/write offset with respect to the mechanical displacement at a certain timing and performs data writing and data reading at a correct position. More specifically, for example, at a time of activation of the disk drive 10, the disk drive 10 calculates a shift amount from an initial value (read/write offset set at a time of shipment) of the read/write offset. In addition, the disk drive 10 calculates a correction value (hereinafter, referred to as a position correction value) for correcting a shift amount (hereinafter, sometimes referred to as an offset shift amount) of the calculated read/write offset. In addition, the disk drive 10 performs write of data to the disk 11 and read of data from the disk 11 by using the calculated position correction value. The offset shift amount is a shift amount from the initial value of the read/write offset.

In addition, the read/write offset is stored in a storage unit of a certain nonvolatile memory included in the disk drive 10 at the time of shipment. For example, the read/write offset is stored in a system region of the disk 11 or a memory 15. In the latter case, at least a portion of the memory 15 is configured with the nonvolatile memory. The read/write offset is stored in the nonvolatile memory.

The disk drive 10 according to the embodiment calculates the position correction value based on the offset shift amount occurring in a case where the mechanical displacement occurs due to a change of the environment or the like and corrects a position of the head H by using the calculated position correction value. In addition, the disk drive 10 can move the head H to a desired position by using the initial value of the read/write offset at the time of shipment. For this reason, the disk drive 10 may correct the position of the head H so that offset shift amount which is a shift amount from the initial value of the read/write offset is removed. The disk drive 10 calculates the position correction value by which the offset shift amount can be removed and corrects the position of the head H with the position correction value.

The disk drive 10 is connected to the host device HC. The disk drive 10 includes the disk (magnetic recording medium) 11 as a nonvolatile storage device, a spindle motor (SPM)

12, a head stack assembly (hereinafter, referred to as an HSA) 13, and a head amplifier integrated circuit (hereinafter, referred to as a head amplifier IC) 14.

In addition, the disk drive 10 includes a memory 15, a read/write channel (hereinafter, referred to as an R/W channel) 16, a hard disk controller (hereinafter, referred to as an HDC) 17, and a central processing unit (hereinafter, referred to as a CPU) 18 as an example of a processor. In addition, the disk drive 10 includes a motor driver IC 20 and a temperature sensor 25.

The disk 11 has a recording surface where data are recorded, and the disk is rotationally driven by the spindle motor 12. A plurality of the disks (platters) 11 is installed in the disk drive 10. In addition, physical addresses which are position information indicating physical positions of the recording surfaces are set to all the recording surfaces included in the disk drive 10. The physical addresses may be allocated, for example, in units of a sector. The spindle motor 12 is driven by current or voltage supplied from the motor driver IC 20.

The HSA 13 includes a first arm 30 and a voice coil motor (VCM) 132 which drives the first arm 30, and a pivot 33. The first arm 30, the VCM 132, and the pivot 33 constitute a first actuator. In addition, the HSA 13 further includes a second actuator 32. The second arm 31 and the head (magnetic head) H constitute the second actuator 32.

The second actuator 32 is installed to the one end side (side opposite to the VCM 132) of the first arm 30, and the pivot 33 is installed to the other end side (side close to the VCM 132). In addition, the head H is installed to the one end side (side opposite to the first arm 30) of the second arm 31 and a fulcrum portion is installed to the other end side (side close to the first arm 30).

The second arm 31 is installed with respect to each head H to support each head H. The first arm 30 is installed with respect to each second arm 31 to support each second arm 31.

The first actuator controls movement of the second actuator 32 supported by the first arm 30 to a certain position by driving of the VCM 132. The second actuator 32 controls movement of the head H supported by the second arm 31 to a certain position on the recording surface of the disk 11.

The disk drive 10 includes a device mechanism (drive mechanism) including the first arm 30 and the second arm 31 and the later-described control signal processing system. The HSA 13 includes the first arm 30 and the second arm 31 mounted on the first arm 30 to operate as a head suspension by allowing the first arm 30 and the second arm 31 to cooperate with each other. Due to this configuration of the HSA 13, the head H can move in the radial direction of the recording surface of the disk 11.

More specifically, the head H moves over the disk 11 in the radial direction by head position alignment control (servo control) of the CPU 18. In addition, the second actuator 32 also moves in the radial direction by control of the CPU 18. Therefore, the head H is positioned at the target position (target track) on the disk 11.

The head H is installed for each recording surface of the disk 11. The head H includes a write head 42 used for writing data to the disk 11 and a read head 41 used for reading data from the disk 11.

The write head 42 writes (records) data to the disk 11. In addition, in a manufacturing process, an offset measurement servo pattern (offset measurement position information) may be written by a servo write dedicated device or may be written by the write head 42 in the disk drive 10.

The read head 41 reads (reproduces) data or servo information from the disk 11. The read head 41 is used for position alignment, for example, at the time of writing data on the disk 11 by the write head 42. In addition, in the description hereinafter the offset measurement servo pattern is also referred to as measurement data.

The pivot 33 becomes a rotation shaft of the first arm 30. The VCM 132 includes a magnet, a yoke, and a coil (VCM coil) for rotating the first arm 30 by using the pivot 33 as an axis. The VCM 132 is driven by current or voltage supplied from the motor driver IC 20. In the VCM 132, by controlling a force (torque) exerted on the VCM coil, the speed of the head H at a time of moving is controlled.

The head amplifier IC 14 outputs a write signal (current or voltage) according to the write data input from the R/W channel 16 to the head H. In addition, the head amplifier IC 14 amplifies a read signal (read data read from the disk 11 by the head H) output from the head H to transmit the read signal to the R/W channel 16.

The temperature sensor 25 detects a device temperature which is a temperature in the vicinity of the disk 11. The temperature sensor 25 detects the device temperature in a certain period and transmits the detected device temperature to the HDC 17. In addition, the temperature sensor 25 may output the detected device temperature to the CPU 18.

The memory 15 is a random access memory (RAM) or the like and is used as a temporary storage area. The memory 15 is configured with a volatile memory such as a synchronous dynamic RAM (SDRAM) or a static RAM (SRAM). In addition, the memory 15 may be a nonvolatile memory such as a flash memory. The memory 15 stores the offset shift amount, the position correction value, and the like. In addition, the memory 15 includes a cache (buffer) used for data reading and data writing between the host device HC and the disk 11.

The cache of the memory 15 includes a write cache and a read cache. The write cache temporarily stores data which are to be written to disk 11 by a write command instructing writing of the write data to the disk 11. The read cache temporarily stores data which are to be read from the disk 11 by a read command instructing reading of the read data from the disk 11.

Herein, the write command includes a start logical block address (hereinafter, referred to as an LBA) of a logic sector of a recording destination of the write data among logic sectors managed in the disk 11 and a write data length. In addition, the read command includes a start LBA of a logic sector where the to-be-read read data are stored among the logic sectors managed in the disk 11 and a read data length.

If the disk drive 10 is powered on (activated), information is read from the disk 11 to be stored in the memory 15. In the memory 15, if necessary, the stored information is overwritten. In addition, after the disk drive is powered on (activated), information may be read from a nonvolatile memory other than the disk 11 to be stored in the memory 15.

The offset shift amount is measured at a certain timing to be stored in the memory 15. The offset shift amount is measured, for example, at the time when the disk drive 10 is activated, at every certain time, or at the time when temperature change is detected. In addition, the position correction value is calculated to be stored in the memory 15 at the time when the offset shift amount is measured.

The HDC 17 includes a communication interface circuit enabling communication with the host device HC. The HDC 17 stores data from the host device HC in the cache of the memory 15 and, after that, transmits the data to the R/W channel 16.

In a case where the HDC 17 receives a write command from the host device HC, the HDC stores the write command in the memory 15, stores the write data in the cache of the memory 15, and returns the response to the host device HC if the writing process is ended. In addition, in a case where the HDC 17 receives a read command from the host device HC, the HDC stores the read command in the memory 15 and returns the read data stored in the cache by the reading process to the host device HC.

The CPU 18 is a main controller (processor) of the disk drive 10 and performs various processes such as a control process for writing the write data and reading the read data by the head H, a servo control process of controlling a position of the head H on the recording surface of the disk 11. In addition, the CPU 18 performs a process of measuring the offset shift amount and a process of calculating the position correction value. In addition, the CPU 18 performs the above-described various processes by a program stored in a nonvolatile storage medium such as a read only memory (ROM) (not illustrated) and the disk 11.

The motor driver IC 20 controls power in the disk drive 10. The motor driver IC 20 performs control for a power source, control for the spindle motor 12, and control for driving of the VCM 132. In order to perform the control for the power source, the motor driver IC 20 receives source power from the host device HC and supplies the power based on the received source power to components of the disk drive 10. In order to perform the control for the spindle motor 12, the motor driver IC 20 controls rotation of the spindle motor 12.

In the disk drive 10, the R/W channel 16, the HDC 17, and the CPU 18 are incorporated into an integrated circuit 19 referred to as a system on chip (SoC) integrated in one chip. The integrated circuit 19 functions as a controller in a broad sense.

The CPU 18 calculates the offset shift amount based on a difference between a position where the write head 42 writes measurement data and a position where the read head 41 reads the measurement data. In addition, the CPU 18 calculates the position correction value based on the offset shift amount, a physical distance in a disk radial direction between the read head 41 and the write head 42, or the like.

In addition, the measurement data may be written in the disk 11 before shipment. In this case, the CPU 18 calculates the offset shift amount based on a difference between a position where the measurement data are written and a position where the read head 41 reads the measurement data.

In the head H, the read head 41 and the write head 42 are arranged at a separate distance on one slider which is a main body of the head H. For this reason, it is known that there is a possibility that a certain offset (position shift) occurs in each track trajectory of the read head 41 and the write head 42. Therefore, the read/write offset depends on a radial position on the disk 11.

Herein, in a case where the write head 42 is disposed at the side closer to the distal end of the second actuator 32 than the read head 41, there is a radial position where the write head 42 and the read head 41 overlap each other on the track of the disk 11. In other words, in the movement position of the head H, there is a radial position where the write head 42 and the read head 41 ride on the same track. Read/write skew at the radial position is set to 0. The read/write skew is an angle between a line connecting a rotation center of the second actuator 32 and a center point of the head H and a tangent line of a track arc.

In a case where the head H is positioned closer to the outer circumference side than to the position where the read/write skew is 0, the read head 41 is positioned at the inner circumference side with respect to the write head 42. On the other hand, in a case where the head H is position closer to the inner circumference side than to the position where the read/write skew is 0, the read head 41 is positioned at the outer circumference side with respect to the write head 42.

On the disk 11, servo areas 50 are arranged radially at a certain arrangement interval. In addition, on the disk 11, a plurality of tracks (cylinders) 70 is arranged concentrically. In addition, the track 70 denotes both of a data track where user data are recorded by the write head 42 and a servo track configured with a plurality of the servo areas 50. Hereinafter, an n-th (n is a natural number) track is referred to as a track n.

In the servo area 50, servo information and first-order eccentricity information (repeatable run out (RRO) bit information) are recorded. The servo information includes an address code (cylinder code) for identifying each track 70 and a servo burst signal for detecting a position of the head H in the track 70. The first-order eccentricity information is information used for position correction of the head H according to circularity of the track 70 or the like and is written before shipment of the disk drive 10.

The second actuator 32 is used at the time of correcting the position of the head H based on the position correction value calculated by the CPU 18. In addition, the second actuator 32 is also used at the time of reading the first-order eccentricity information. In addition, the second actuator 32 is used at the time of performing the position alignment of the head H together with the first actuator.

In order to correct the position of the head H based on the position correction value, the second actuator 32 moves the head H at a first stroke. In addition, in order to perform the position alignment of the head H together with the first actuator, the second actuator 32 moves the head H at a second stroke which is smaller than the first stroke.

The CPU 18 performs head position alignment control (servo control) by using the servo information read by the read head 41. A control signal processing system for the head position alignment control includes a motor driver IC 20, a head amplifier IC 14, an R/W channel 16, an HDC 17, a CPU 18, and a memory 15.

In addition, the second actuator 32 is also referred to as a micro-actuator, a dual-stage actuator, a fine movement actuator, or the like.

Figure 2:
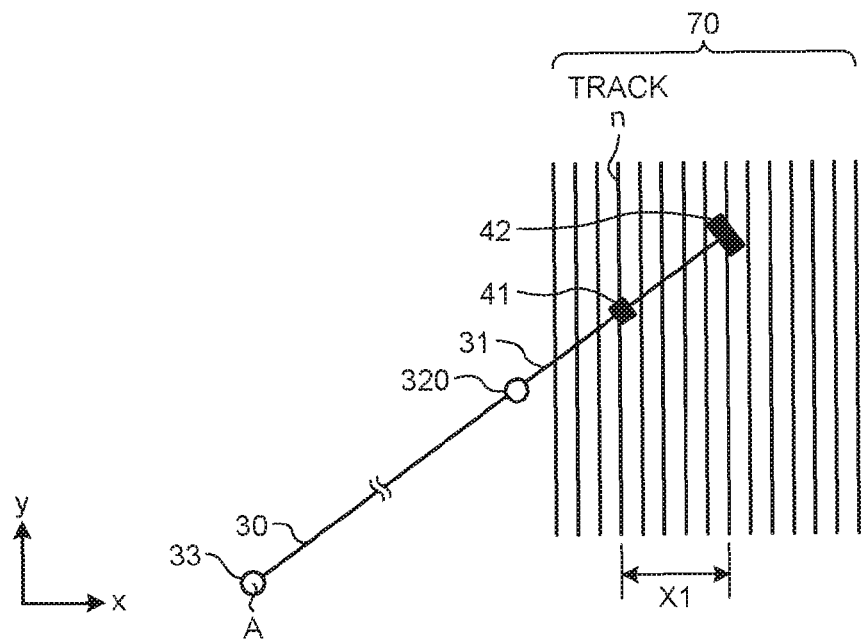
FIG. 2 is a diagram illustrating a position relationship between a head and tracks at the time of data writing.

Next, the position of the head H at the time of data writing will be described. FIG. 2 is a diagram illustrating a position relationship between a head and tracks at the time of data writing. Herein, a position relationship between the head H (write head 42 and read head 41) and the tracks 70 at the time of data writing will be described.

In FIG. 2 and the later-described FIGS. 3, 4, and 8, the write head 42, the read head 41, the second arm 31, a virtual operation fulcrum (hereinafter, referred to as a fulcrum portion 320) of the second actuator 32, a first arm 30, a pivot 33, tracks 70, and the like are schematically illustrated. In addition, in FIG. 2 and the later-described FIGS. 3, 4, and 8, the n-th track of the tracks 70 is illustrated as a track n.

As illustrated in FIG. 2, in some case, there is a physical distance between the read head 41 and the write head 42. In this case, the read head 41 and the write head 42 are not positioned simultaneously at the same radial position (the same track). In other words, in some case, the read head 41 and the write head 42 are positioned at different positions at the time of data recording.

For this reason, the write head 42 exists at a position shifted by read/write offset with respect to the read head 41 which is position-aligned at the time of data writing. For example, in the case of writing data at a certain address of the disk 11, the read head 41 is positioned on a specific track n. In this case, the write head 42 writes the write data at a position separated by an inter-track distance X1 from the position of the read head 41. The inter-track distance is in the direction perpendicular to the extending installation direction of the tracks 70. For example, in a case where the tangent lines of the tracks 70 are extending in the y direction, the inter-track distance is a distance (distance in the radial direction of the disk 11) in the x direction perpendicularly intersecting the y direction.

In a case where there is no mechanical displacement, the read head 41 performs reading the data of the track n written by the write head 42 by using the read/write offset which is adjusted in advance before shipment. In this case, the read head 41 offsets the read head 41 by only the inter-track distance X1 from the position of the track n and performs reading the data.

In this manner, at the time of data reading, the read head 41 shifts the position of the read head 41 by only the read/write offset with respect to the position of the read head 41 at the time of data writing and reads the data.

If the write data are recorded at a position slightly shifted from a target track 70, for example, by read retry, data reading at the optimal position is available by shifting the read head 41 in the radial direction from a radial position which is based on the read/write offset set at the time of reading.

However, in some cases, mechanical displacement such as inclination or shift of the pivot 33 and a change of a clamp state of the disk 11 occurs due to heat, impact, or the like. In this case, in the disk drive 10, read/write offset different from the read/write offset at the time of shipment occurs.

Figure 3:
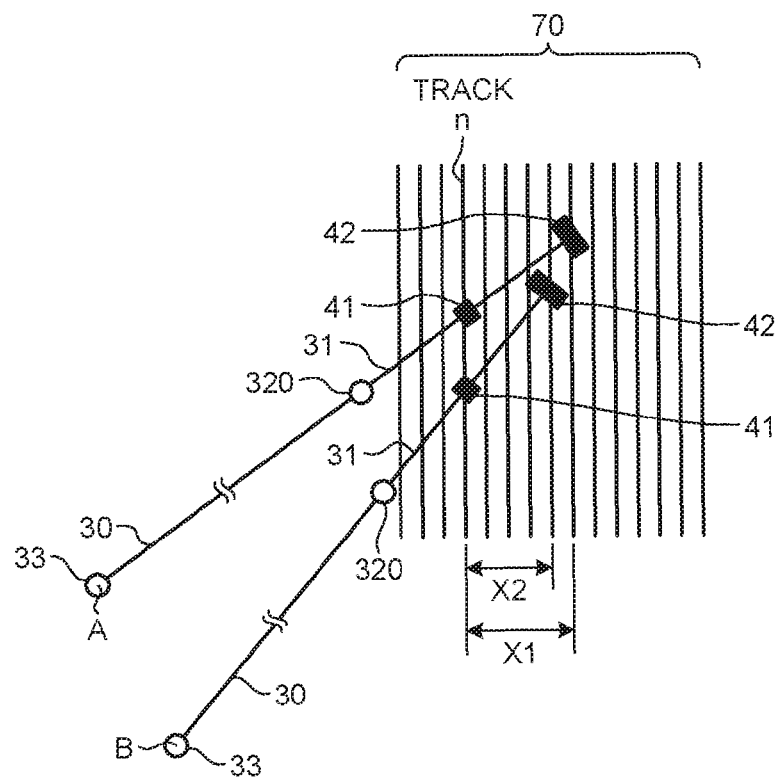
FIG. 3 is a diagram illustrating a position relationship between the head and the tracks in a case where mechanical displacement has occurred.
Figure 4:
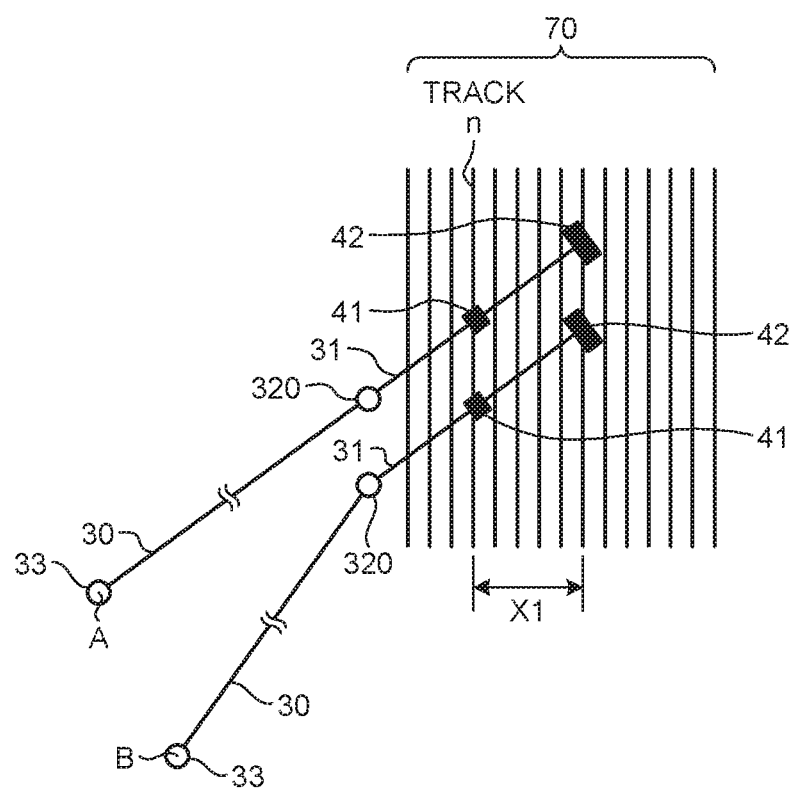
FIG. 4 is a diagram illustrating write position correction.

FIG. 3 is a diagram illustrating a position relationship between a head and tracks at the time when mechanical displacement occurs. Herein, the position relationship between the head H (write head 42 and read head 41) and the tracks 70 at the time when mechanical displacement occurs in the pivot 33 will be described.

In general, the read/write offset is determined by movement of the first arm 30 or the second arm 31 in the rotation shaft direction. However, in some cases, a shift may occur in the read/write offset due to environment temperature or impact.

For example, in some case, the rotation center of the pivot 33 of the first arm 30 is shifted from the center A to the center B and a relationship between an arm posture and disk 11 is changed from that at the time of shipment at factory. In this case, with respect to the read head 41 which is position-aligned in order to record data at a certain address, the write target position on the disk 11 and the position of the write head 42 are shifted from each other. For example, in some cases, although the read head 41 is moved onto a desired track n, the write head 42 is shifted to a position different from the position where the write head 42 is initially assumed to be positioned. In this case, the write data which are to be recorded in the track of the position separated by the inter-track distance X1 from the read head 41 are recorded in the track of the position separated by the inter-track distance X2 from the read head 41.

In a case where the relationship between the disk 11 and the position of the read head 41 and the position of the write head 42 at a certain address is broken, the recording data affect data of adjacent tracks or data of neighbor tracks. For this reason, in the worst case, the mechanical displacement leads to data destruction. Therefore, it is preferable that the position of the head H is corrected according to the drive environment.

The correction of the write position caused by the mechanical displacement is performed by using the second actuator 32. FIG. 4 is a diagram illustrating write position correction. Herein, the position relationship between the head H (write head 42 and read head 41) and the tracks 70 at the time when the write position is corrected will be described.

For example, in a case where a pivot center A is shifted from a pivot center B, in order to correct the shift amount, correction is performed by the second actuator 32 so that the distance between the read head 41 and the write head 42 is returned from the inter-track distance X2 to the inter-track distance X1. More specifically, the second actuator 32 rotates the read head 41 and the write head 42 so that, in the state where the read head 41 is positioned on a desired track n, the write head 42 is positioned on a desired track 70. Therefore, even in a case where the pivot center A is shifted to the pivot center B, the read head 41 and the write head 42 can be moved to desired track positions.

Since the causes of the mechanical displacement are various, it is preferable that the position correction value used for the write head 42 is calculated according to individual states of the drives. Therefore, in the embodiment, the CPU 18 of the disk drive 10 calculates the position correction value which is an offset correction amount at the time of writing at the time when the disk drive 10 is activated, at every certain time, or at the time when the temperature is changed. For example, with respect to a plurality of heads H, the CPU 18 calculates the position correction values for two points or two or more points on the disk 11 for each head H. Next, the CPU 18 calculates position correction values on the entire disk 11 for each head H based on the calculated position correction values.

Figure 5:
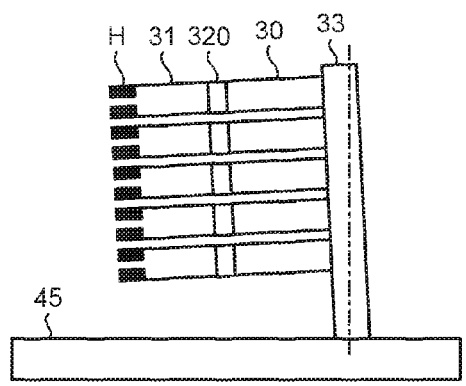
FIG. 5 is a diagram illustrating an example of an HSA state at the time when mechanical displacement has occurred.

FIG. 5 is a diagram illustrating an example of an HSA state at the time when mechanical displacement occurs. FIG. 5 illustrates a cross-sectional diagram illustrating the head H, the second arm 31, the fulcrum portion 320, the first arm 30, the pivot 33, a base 45, and the like.

In the disk drive 10, a plurality of the heads H is arranged in the head stack assembly (HSA) 13. The pivot 33 is fixed to the base 45. The pivot 33 is installed to extend perpendicularly to the upper surface of the base 45. In some cases, the pivot 33 is inclined with respect to the base 45 due to an external cause. In this case, the first arm 30 or the second arm 31 is also inclined with respect to the base 45. As a result, the read head 41 and the write head 42 arranged in the head H are also inclined with respect to the base 45. Therefore, on the disk 11, the read/write offset at each radial position is shifted. Since the shift amount at this time indicates a different value for each head H according to the direction and magnitude of the mechanical displacement, the position correction value for each head H is calculated. In addition, with respect to the head H, the inclination direction is not limited to the direction illustrated in FIG. 5, but the head may be inclined in various directions.

Figure 6:
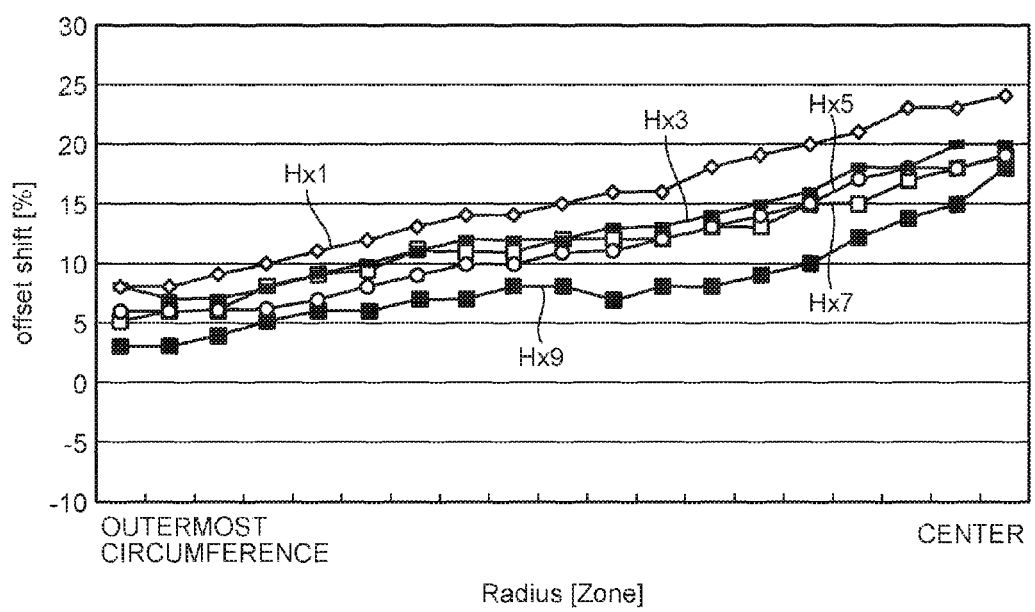
FIG. 6 is a diagram illustrating an example of an offset shift amount for each heads.

In the embodiment, the offset shift amount which is a shift amount of the read/write offset at the time of activation or the like is measured. FIG. 6 is a diagram illustrating an example of an offset shift amount for each head. The horizontal axis of FIG. 6 denotes a position on the disk 11 in the radial direction, and the vertical axis denotes an offset shift amount. The offset shift amount in the vertical axis is a ratio (%) of a shift amount to a read/write offset (reference value=0) at the time of shipment. More specifically, the offset shift amount denotes a ratio of the shift amount in a case where the read/write offset at the time of shipment is defined as 100%. Therefore, the offset shift amount indicating 0 in the vertical axis corresponds to the inter-track distance X1. In addition, the offset shift amounts of the graphs correspond to (X1−X2)/X1.

For example, in some cases, the head H includes ten heads H1 to H10. In this case, the offset shift amounts are measured for the respective heads H1 to H10. In FIG. 6, the offset shift amounts Hx1, Hx3, Hx5, Hx7, and Hx9 of the heads H1, H3, H5, H7, and H9 are illustrated, and the offset shift amounts of the other heads are omitted in illustration.

In the case of the example illustrated in FIG. 6, in the head H1, at the center position, a position shift of an increase of about 25% in maximum from the read/write offset at the time of shipment occurs. The disk drive 10 calculates the position shift of about 25% as an offset shift amount and calculates the position correction value where the position shift of 25% is eliminated.

In addition, the CPU 18 may calculate the offset shift amounts at various positions on the disk 11 based on the offset shift amounts calculated with respect to at least two points on the disk 11. For example, the CPU 18 calculates the offset shift amounts of the respective positions on the disk 11 by interpolating the offset shift amounts calculated with respect to certain points (two or more points) on the disk 11. In addition, the CPU 18 may calculate an approximate equation by using the offset shift amounts calculated with respect to the certain points on the disk 11 and may calculate the offset shift amounts at the respective positions on the disk 11 based on the approximate equation. The CPU 18 may calculate the offset shift amounts as a data table and may calculate the offset shift amounts as an approximate equation. In addition, the offset shift amount is not limited to a ratio with respect to an initial value, but the offset shift amount may be an actual distance of a position shift.

Figure 7:
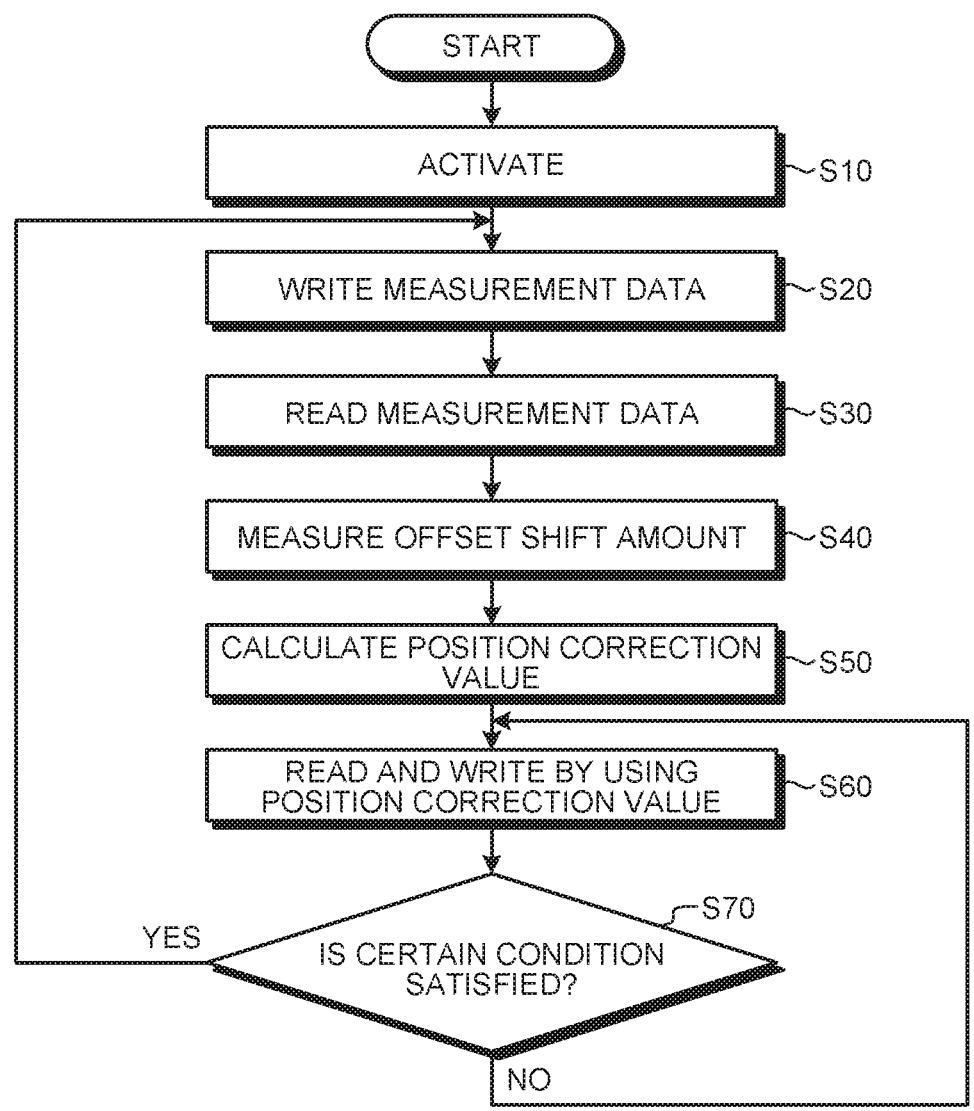
FIG. 7 is a flowchart illustrating a procedure of a position correction process of a position correction method according to the embodiment.

Next, a procedure of a position correction process of the head H will be described. FIG. 7 is a flowchart illustrating a procedure of a position correction process according to an embodiment. If the disk drive 10 is activated (S10), the write head 42 writes measurement data at a certain position on the disk 11 (S20).

The write head 42 writes the measurement data at various positions from the center side to the outer circumference side of the disk 11. Therefore, in order to write the measurement data, various current values are supplied to the first actuator. Accordingly, since currents having various current values flow in the coil of the VCM 132, the first actuator is moved to the positions according to the current value. In addition, in order to write the measurement data, the second actuator 32 is controlled to maintain a straight state (state where the first actuator and the second actuator 32 are aligned in the same direction). In other words, in order to write the measurement data, the second actuator 32 is controlled so that the line from the pivot 33 to the write head 42 becomes a straight line. In addition, the straight state includes a state where position alignment control for the write head 42 by the second actuator 32 is not performed and a certain control value is applied to the second actuator 32.

In order for the write head 42 to write the measurement data, the read head 41 is position-aligned to a certain radial position (first track position) on the disk 11. The first track position is stored in the memory 15.

In addition, the read head 41 reads the measurement data which are written by the write head 42 (S30). The read head 41 reads the measurement data written at various positions from the center side to the outer circumference side of the disk 11. Therefore, in order to read the measurement data, various current values are supplied to the first actuator. Accordingly, since currents having various current values flow in the coil of the VCM 132, the first actuator is moved to the positions according to the current value. In addition, in order to read the measurement data, the second actuator 32 is controlled to maintain a straight state (state where the first actuator and the second actuator 32 are aligned in the same direction). In other words, in order to read the measurement data, the second actuator 32 is controlled so that the line from the pivot 33 to the read head 41 becomes a straight line. In addition, the straight state includes a state where position alignment control for the read head 41 by the second actuator 32 is not performed and a certain control value is applied to the second actuator 32.

At this time, the read head 41 reads the position (second track position) of the read head 41 on the disk 11 at the time when the measurement data are read. At the time of reading, in the respective radial positions (tracks), the read heads 41 are position-aligned at positions which are optimized by appropriately offsetting. The read second track positions are stored in the memory 15.

Next, the CPU 18 measures offset shift amounts (S40). More specifically, the CPU 18 calculates the offset shift amounts based on the first and second track positions stored in the memory 15.

In addition, the CPU 18 calculates the position correction values according to the offset shift amounts (S50). The position correction values are stored as latest position correction values in the memory 15. Next, the disk drive 10 performs data writing or data reading on the disk 11 by using the latest position correction values (S60).

Next, the disk drive 10 performs the data writing or the data reading on the disk 11 by using the latest position correction values while determining whether or not a certain condition is satisfied. The certain condition is a condition as to whether or not a certain time elapses after the latest position correction values are calculated, a condition as to whether or not a certain temperature change occurs, or the like.

The CPU 18 determines based on, for example, temperature detected by a temperature sensor 25 or time measured by a timer (not illustrated) whether or not the certain condition is satisfied. For example, in a case where a temperature difference between the temperature at the time when the latest position correction value is calculated and the updated temperature detected by the temperature sensor 25 exceeds a threshold value, the CPU 18 determines that the certain condition is satisfied. In addition, in a case where the temperature (latest temperature detected by the temperature sensor 25) which is not a relative temperature but an absolute temperature exceeds a certain value, the CPU 18 may determine that the certain condition is satisfied. In addition, in a case where a time measured by the timer from the time when the latest position correction value is calculated exceeds a threshold value, the CPU 18 determines that the certain condition is satisfied.

In a case where the certain condition is satisfied (Yes in S70), the disk drive 10 repeats the processes of S20 to S60. More specifically, the disk drive 10 calculates the latest position correction value again. The position correction value is stored as a latest position correction value in the memory 15. Therefore, the position correction value is updated with the latest position correction value. Next, the disk drive 10 performs data writing or data reading on the disk 11 by using the latest position correction value.

Next, the disk drive 10 performs data writing or data reading on the disk 11 by using the latest position correction value while determining whether or not the certain condition is satisfied. In a case where the certain condition is not satisfied (No in S70), the disk drive 10 continues to perform a process of performing data writing or data reading on the disk 11 by using the latest position correction value while determining whether or not the certain condition is satisfied (S60).

In this manner, in the embodiment, the disk drive 10 calculates the read/write offset shift amounts at a certain timing after activation. In addition, the disk drive 10 calculates the position correction values based on the offset shift amounts. Next, the disk drive 10 performs data writing or data reading with respect to the disk 11 by using the calculated position correction values. Therefore, performance of the disk drive 10 is improved. For example, due to implementation of high recording density, in the disk drive 10 of which pitch width (TPI) in the track direction is narrowed, even in a case where mechanical displacement occurs, writing can be performed at an appropriate position on the disk 11, so that it is possible to correctly read recorded data. Therefore, it is possible to perform data writing or data reading while suppressing loss of data or deterioration in performance. As a result, it is possible to improve reliability of the disk drive 10.

However, if the mechanical displacement exceeds a certain value, there is a possibility that the write position correction in the second actuator 32 is not performed. In this case, the CPU 18 changes the track number indicating the position of the read head 41 which is to be position-aligned at the time of writing from n to n+m (m is an integer). Therefore, the CPU 18 controls the second actuator 32 while suppressing the position correction amount within a movable range of the second actuator 32.

Figure 8:
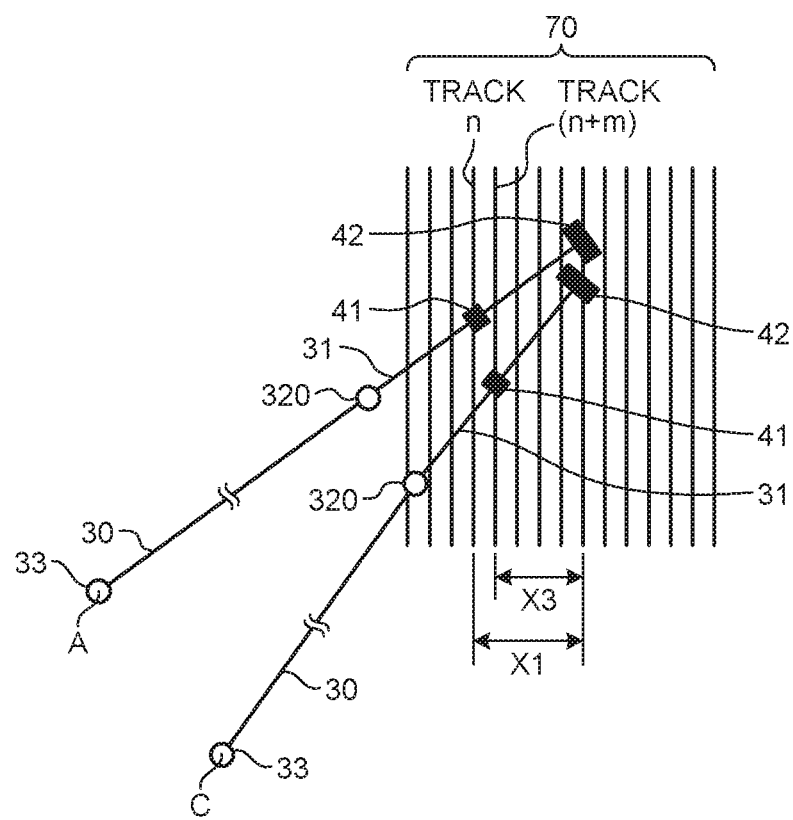
FIG. 8 is a diagram illustrating write position correction in a case where mechanical displacement is larger than a certain value.

FIG. 8 is a diagram illustrating the write position correction in a case where the mechanical displacement is larger than a certain value. Herein, a position relationship between the head H (write head 42 and read head 41) and tracks 70 in a case where the write position is corrected will be described. In addition, FIG. 8 illustrates a (n+m)-th track of the tracks 70 as a track (n+m).

For example, in some cases, a pivot center A is shifted to a pivot center C. In addition, it is assumed that the write position correction cannot be performed on the shift amount by the second actuator 32. In other words, since the mechanical displacement is larger than the certain value, although the read head 41 is position-aligned to a desired track number, in some cases, it is not possible to move the write head 42 to the desired track number.

In this case, the CPU 18 changes the track number indicating the position of the read head 41 from n to n+m. The CPU 18 controls the second actuator 32 so that the read head 41 is moved to the track (n+m) and the write head 42 is moved to the position of the desired track number. Therefore, the write head 42 writes the write data at the position separated by only the inter-track distance X3 from the position of the read head 41.

As a result, even in a case where the pivot center A is shifted to the pivot center C, it is possible to move the read head 41 and the write head 42 to the desired positions. As a result, even in a case where the mechanical displacement is larger than the certain value, the disk drive 10 can perform data writing at a correct position.

In addition, a portion or all of the calculation process for the offset shift amount and the calculation process for the position correction value may be embodied by hardware or by a combination of hardware and software.

According to the embodiment, the disk drive 10 calculates the offset shift amounts of the read head 41 and the write head 42 with respect to the tracks 70 at a certain timing after activation. In addition, the disk drive 10 controls the second actuator 32 to correct the position of the head H to the position according to the offset shift amount. Therefore, even in a case where mechanical displacement occurs after shipment of the disk drive 10 at a factory, it is possible to write data in a correct position on the disk 11, and it is possible to correctly read the data written on the disk 11.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk drive comprising:
a disk;
a first actuator including a first arm;
a second actuator including a second arm, the second actuator being capable of being moved by the first actuator;
a head that is capable of being moved by the second actuator, the head including a write head to write data onto the disk and a read head to read data from the disk; and
a controller circuitry that controls the second actuator to reduce an offset shift amount, the offset shift amount being a shift amount between a first offset value and a second offset value, the first offset value being obtained before the second offset value is obtained, the first offset value and the second offset value being offset values between the read head and the write head in a radial direction of the disk.

2. The disk drive according to claim 1, wherein the controller circuitry calculates a position correction value according to the offset shift amount and corrects a position of the write head or the read head by using the calculated position correction value.

3. The disk drive according to claim 2, wherein, at the time of data writing, the controller circuitry corrects the position of the write head or the read head by using the calculated position correction value.

4. The disk drive according to claim 2, wherein, at the time of data reading, the controller circuitry corrects the position of the write head or the read head by using the calculated position correction value.

5. The disk drive according to claim 2, further comprising a memory that stores a read-write offset corresponding to the first offset value, the read-write offset indicating a positional relationship between the read head and the write head in the radial direction of the disk at the time of manufacturing the disk drive, wherein the controller circuitry calculates the position correction value by using the read-write offset in the memory.

6. The disk drive according to claim 2, wherein the controller circuitry calculates the position correction value based on offset shift amounts calculated with respect to at least two points on the disk.

7. The disk drive according to claim 1, wherein, in a case where the offset shift amount exceeds a limit from which a position of the head is correctable by the second actuator, the controller circuitry changes a track position of the head, controls the second actuator, and corrects the position of the head to a position according to the offset shift amount.

8. The disk drive according to claim 1, wherein, at the time of calculating the offset shift amount,
the write head writes measurement data onto the disk, and the read head reads the measurement data from the disk, and
the controller circuitry calculates the offset shift amount based on a position where the measurement data has been read.

9. The disk drive according to claim 1,
wherein the head includes a first head and a second head, and
the controller circuitry calculates a first offset shift amount with respect to the first head and corrects a position of the first head to a position according to the first offset shift amount, and calculates a second offset shift amount with respect to the second head and corrects a position of the second head to a position according to the second offset shift amount.

10. The disk drive according to claim 1, wherein the controller circuitry calculates the offset shift amount for at least one of:
a time of activation of the disk drive,
a time when a certain time is has elapsed, and
a time when a certain temperature change has been detected.

11. A position correction method comprising:
controlling a head of a disk drive, the disk drive including a first actuator, a second actuator, and the head, the first actuator including a first arm, the second actuator including a second arm, the second actuator being capable of being moved by the first actuator, the head being capable of being moved by the second actuator, the head including a write head to write data onto a disk and a read head to read data from the disk; and
controlling the second actuator to reduce an offset shift amount, the offset shift amount being a shift amount between a first offset value and a second offset value, the first offset value being obtained before the second offset value is obtained, the first offset value and the second offset value being offset values between the read head and the write head in a radial direction of the disk.

12. The position correction method according to claim 11, further comprising:
calculating a position correction value according to the offset shift amount; and
correcting a position of the write head or the read head by using the calculated position correction value.

13. The position correction method according to claim 12, further comprising correcting, at the time of data writing, the position of the write head or the read head by using the calculated position correction value.

14. The position correction method according to claim 12, further comprising correcting, at the time of data reading, the position of the write head or the read head by using the calculated position correction value.

15. The position correction method according to claim 12, further comprising:
storing a read-write offset corresponding to the first offset value in a memory, the read-write offset indicating a positional relationship between the read head and the write head in the radial direction of the disk at the time of manufacturing the disk drive; and
calculating the position correction value by using the read-write offset in the memory.

16. The position correction method according to claim 12, further comprising calculating the position correction value based on offset shift amounts calculated with respect to at least two points on the disk.

17. The position correction method according to claim 11, wherein, in a case where the offset shift amount exceeds a limit from which a position of the head is correctable by the second actuator, the method further comprising:
changing, a track position of the head;
controlling the second actuator; and
correcting the position of the head to a position according to the offset shift amount.

18. The position correction method according to claim 11, wherein, at the time of calculating the offset shift amount,
the write head writes measurement data onto the disk, and the read head reads the measurement data from the disk, and
the offset shift amount is calculated based on a position where the measurement data has been read.

19. The position correction method according to claim 11, further comprising:
calculating a first offset shift amount with respect to a first head in the head;
calculating a second offset shift amount with respect to a second head in the head;
correcting a position of the first head to a position according to the first offset shift amount; and
correcting a position of the second head to a position according to the second offset shift amount.

20. The position correction method according to claim 11, wherein the offset shift amount is calculated for at least one of:
a time of activation of the disk drive,
a time when a certain time has elapsed, and
a time when a certain temperature change has been detected.

* * * * *